United States Patent
Mejia Velez et al.

(10) Patent No.: US 12,223,159 B2
(45) Date of Patent: Feb. 11, 2025

(54) METHOD TO DESCRIBE A SCREEN CAPTURE USING AI FOR THE VISUALLY IMPAIRED

(71) Applicant: MICROSOFT TECHNOLOGY LICENSING, LLC, Redmond, WA (US)

(72) Inventors: Juan Fernando Mejia Velez, Redmond, WA (US); Stephanie Marie Anderl, Bothell, WA (US)

( * ) Notice: Subject to any disclaimer, the term of this patent is extended or adjusted under 35 U.S.C. 154(b) by 143 days.

(21) Appl. No.: 18/098,541

(22) Filed: Jan. 18, 2023

(65) Prior Publication Data

US 2024/0241622 A1    Jul. 18, 2024

(51) Int. Cl.
*G06F 3/0484* (2022.01)
*G06F 3/16* (2006.01)
*G06F 9/451* (2018.01)

(52) U.S. Cl.
CPC ............ *G06F 3/0484* (2013.01); *G06F 3/167* (2013.01); *G06F 9/451* (2018.02)

(58) Field of Classification Search
CPC ........ G06F 3/048; G06F 3/0484; G06F 3/167; G06F 9/451; G09B 21/001
See application file for complete search history.

(56) References Cited

U.S. PATENT DOCUMENTS

| | | | |
|---|---|---|---|
| 7,847,677 B2 | 12/2010 | Ryan et al. | |
| 11,120,707 B2 | 9/2021 | Hans et al. | |
| 11,417,079 B2 | 8/2022 | Tomsett et al. | |
| 2007/0294630 A1 | 12/2007 | Duncan et al. | |
| 2016/0283073 A1 | 9/2016 | Fu | |
| 2018/0267885 A1 | 9/2018 | Budurean | |
| 2023/0195480 A1* | 6/2023 | Zhang | G06F 3/0481 715/708 |

FOREIGN PATENT DOCUMENTS

CN       104571866 A      4/2015

OTHER PUBLICATIONS

Choney, Suzanne, "Seeing AI", Retrieved From: https://news.microsoft.com/features/bonjour-bienvenidos-seeing-ai-expands-to-5-new-languages/, Dec. 2, 2019, 9 Pages.

(Continued)

*Primary Examiner* — Stacy Khoo
(74) *Attorney, Agent, or Firm* — Workman Nydegger

(57) ABSTRACT

Some disclosed embodiments are directed to methods and systems for performing accessible screen capturing that considers visually impaired users. For example, systems and methods are provided for selecting a screen capture type and determining a screen capture area. Systems temporarily apply the screen capture type to a user display according to the screen capture area and identify an object included in the screen capture area. Systems then obtain application metadata corresponding to the object and generate a screen capture description of the object based on the application metadata corresponding to the object. Subsequently, systems narrate the screen capture description of the object and then generate an image-based screen capture that comprises the object by applying the screen capture type according to the screen capture area and embedding the application metadata into the image-based screen capture.

13 Claims, 15 Drawing Sheets

(56) References Cited

OTHER PUBLICATIONS

Mazzoni, Dominic, "Using AI to give people who are blind the "full picture"", Retrieved From: https://blog.google/outreach-initiatives/accessibility/get-image-descriptions/, Oct. 11, 2019, 4 Pages.

McLachlan, Stacey, "Improved photo descriptions for visually impaired users", Retrieved From: https://blog.hootsuite.com/social-media-updates/facebook/audio-photo-descriptions/, Mar. 18, 2021, 6 Pages.

Pique, et al., "Powered by AI: Automatic alt text to help the blind 'see' Facebook", Retrieved From: https://tech.fb.com/artificial-intelligence/2018/06/using-artificial-intelligence-to-help-blind-people-see-facebook/, Jun. 20, 2018, 22 Pages.

International Search Report and Written Opinion received for PCT Application No. PCT/US2024/010228, mailed on Apr. 11, 2024, 15 pages.

Pareddy, et al., "X-Ray Screenshot Accessibility via Embedded Metadata", Assets'19, Oct. 28-30, 2019, pp. 389-395.

\* cited by examiner

METHOD TO DESCRIBE A SCREEN CAPTURE USING AI FOR THE VISUALLY IMPAIRED

BACKGROUND

Screen capture techniques and tools, such as Snipping Tool, are useful in generating an image of a screen or a portion of a screen. The screen capture tool transfers the pixels displayed on a user display or screen into an image file which can be stored separately from the user display.

Conventional screen capture systems are configured to allow a user to enter into screen capture mode and define a rectangular boundary by clicking a point on the screen and dragging the rectangle into the desired size. Once the screen capture area is selected, an image (i.e., screen capture) is generated based on the selected screen capture area.

For non-visually impaired users, this is an effective way to create an image-based screen capture of one or more objects displayed on the user display. However, for visually impaired users, using the screen capture tool is very difficult because they may not know what part of the screen is being captured when clicking and dragging the screen capture boundary.

In view of the foregoing, there is an ongoing need for improved systems and methods for accessible screen capture tools that consider visually impaired users.

The subject matter claimed herein is not limited to embodiments that solve any disadvantages or that operate only in environments such as those described above. Rather, this background is only provided to illustrate one example technology area where some embodiments described herein may be practiced.

BRIEF SUMMARY

Disclosed embodiments include systems and methods for accessible screen capture tools that consider visually impaired users. In this regard, it will also be appreciated that the disclosed embodiments can facilitate screen capture processes utilizing audible commands and audible descriptions of the content being captured for accommodating needs and preferences of both visually impaired users, as well as non-visually impaired users.

For example, some systems are provided for using artificial intelligence (AI) for identifying and describing visually displayed content and for generating a screen capture of the displayed content to assist visually impaired users in performing screen capture processes.

Systems are configured for temporarily applying a screen capture type to a user display according to a screen capture area and for identifying objects included in the screen capture area. Systems are also configured to obtain application metadata corresponding to the selected objects and to generate screen capture descriptions of the object based on the application metadata. In some instances, the systems narrate the screen capture descriptions of the selected objects. The systems are also configured to generate a shareable file that contains the content of the image-based screen capture, including the visual elements of the selected objects in the screen capture along with the metadata that identifies the selected objects and other screen capture attributes. The systems generate the screen capture file by applying the screen capture type according to the screen capture area and by embedding the application metadata into the image-based screen capture.

Some systems are also provided for automatically generating a screen capture based on previously received user input which selects a particular target object for which a screen capture is intended. For example, some systems narrate a description of a first object displayed within a user interface to indicate to a user that the first object is available to screen capture on the user interface. The systems receive user input for selecting the first object as a target object for a subsequent screen capture and prior to actually generating a screen capture. The systems also automatically select a screen capture type and determine a screen capture area and temporarily apply the screen capture type according to predetermined settings and/or a context of the preselected object, thereby creating a temporary screen capture boundary.

After temporarily applying the screen capture boundary, the systems identify a second object located within the temporarily applied screen capture area and determine whether the first object and the second object are a same object. Upon determining that the first object (e.g., preselected object) and the second object (e.g., identified object in the screen capture boundary) are the same, the systems automatically generate a final screen capture of the user display by applying the screen capture type according to the screen capture area and without requiring subsequent user input for reselecting the first object as the target object from the screen capture boundary after the screen capture boundary is determined.

Additionally, some systems are configured for accessing and rendering screen capture files. For example, the systems are configured to access a screen capture file, to render images included in the file and identify objects in the images based on metadata associated with the screen capture file. Some systems and methods are also provided for accessing an image-based screen capture that comprises embedded metadata corresponding to an object displayed in the image-based screen capture, identifying an object included in the image-based screen capture, and accessing the embedded metadata corresponding to the object. Systems then generate a screen capture description of the object based on the embedded metadata corresponding to the object and generate a new image-based screen capture by embedding the screen capture description of the object into the image-based screen capture.

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the present disclosure may be realized and obtained by means of the instruments and combinations particularly pointed out in the appended claims. Features of the present disclosure will become more fully apparent from the following description and appended claims or may be learned by the practice of the embodiments as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Disclosed embodiments are directed toward systems and methods for facilitating screen capturing that considers visually impaired users. In this regard, it will be appreciated that some of the disclosed embodiments are specifically directed to improved systems and methods for describing and generating screen captures using AI. For example, machine learning models are provided for converting application metadata corresponding to various objects on a user display into screen capture descriptions of the various objects. Some machine learning models are also provided for obtaining new metadata for a previously generated screen capture. The disclosed embodiments provide many technical advantages over existing systems.

For example, in conventional screen capture tools, the screen capture area is defined only visually. A user views the user display, selects the screen capture tool, and manually defines the screen capture area to include the desired portion of the user display using visual cues. After the screen capture is created, it is typically displayed to the user on the user display so that the user can visually inspect the screen capture and determine if they need to take another one or store the currently captured version. This process is highly inaccessible to visually impaired users. While screen readers are available to describe some of the applications and objects displayed within the user interface prior to opening the screen capture tool, visually impaired users may have difficulty selecting the screen capture area that will include the desired applications or objects.

Thus, disclosed embodiments are directed to systems and methods for a screen capture tool that is accessible to visually impaired users. The systems and methods provided are configured to generate screen capture descriptions at various stages of the screen capture process. By implementing systems and methods in this manner, visually impaired users are able to confirm and know what objects are available to capture, which objects will be captured within a potential screen capture boundary, and which objects have been captured in a generated screen capture. Additionally, systems and methods are provided for obtaining additional metadata about the screen capture using post-capture analysis such as computer vision and/or optical character recognition (OCR) technology.

In this manner, the screen capture descriptions are further improved by including information not initially available through the application data. Additionally, previously generated screen captures can be adapted to an accessible screen capture using disclosed embodiments. The screen capture descriptions are further improved in that machine learning models, such as natural language processing models, are able to convert metadata into easily consumable synthesized speech descriptions, which describe the screen capture (or potential screen capture) in conversational or prose language.

Figure 1:
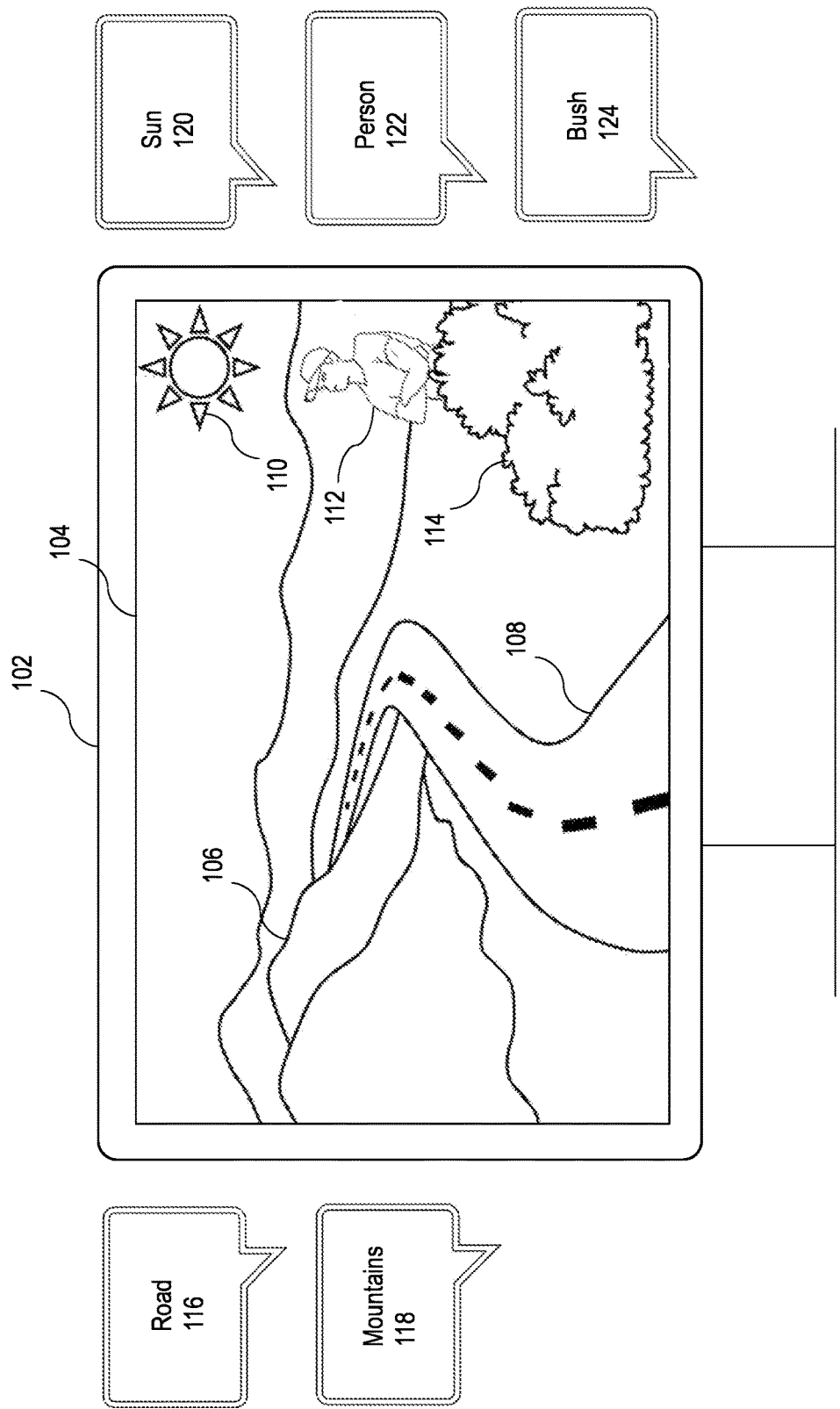
FIG. 1 illustrates an example user interface for describing objects displayed on a user display.
Figure 2:
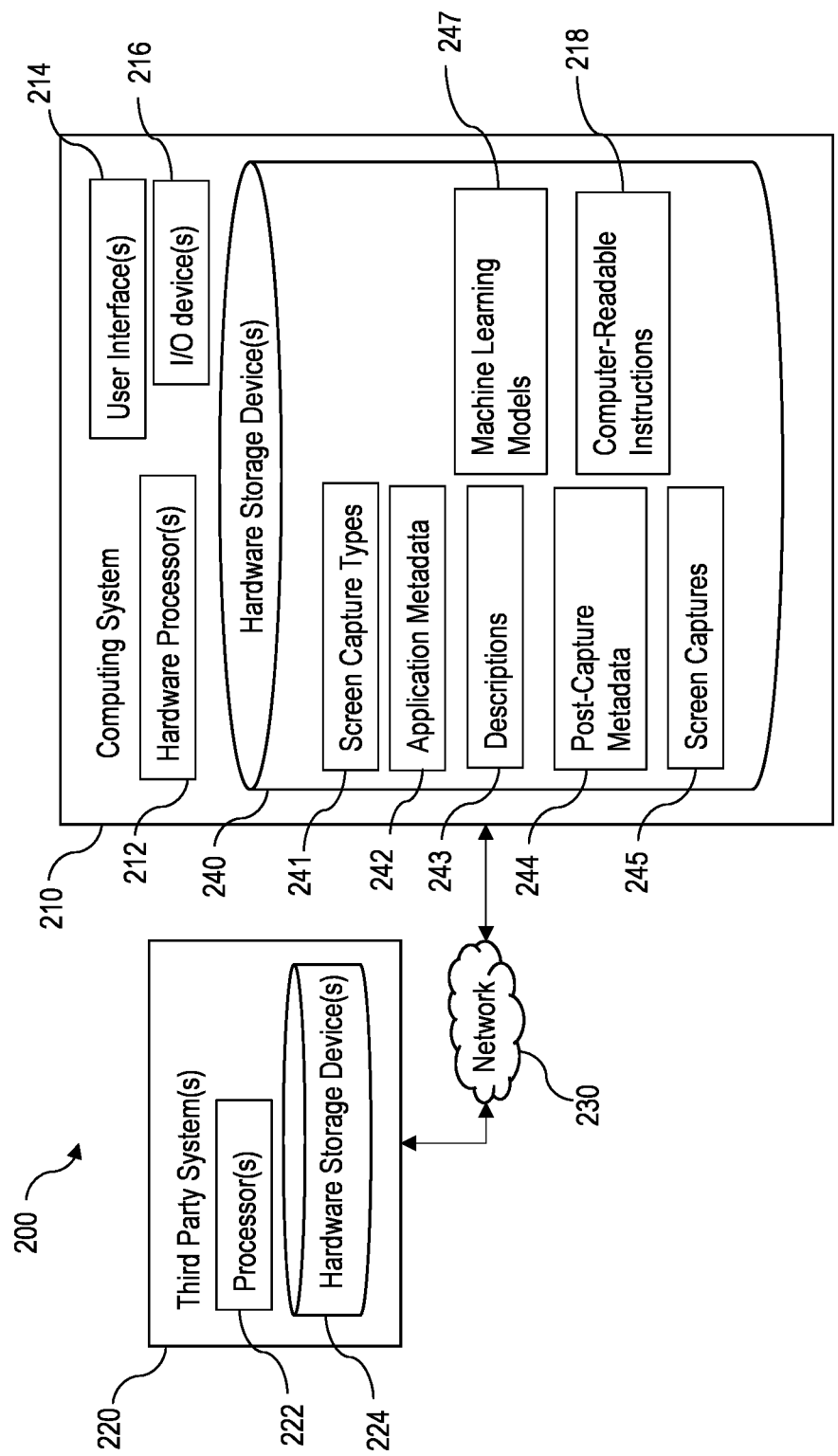
FIG. 2 illustrates a computing environment in which a computing system incorporates and/or is utilized to perform aspects of the disclosed embodiments.

Attention will now be directed to FIG. 2 (with reference to FIG. 1), which illustrates a computing environment 200 that also includes third-party system(s) 220 in communication (via network 230) with a computing system 210, which incorporates and/or is utilized to perform aspects of the disclosed embodiments. Third-party system(s) 220 includes one or more processor(s) 222 and one or more hardware storage device(s) 224. In some instances, the third-party system(s) 220 provide additional information about the objects displayed on the user interface, for example, application metadata retrieved from a remote server or post-processing systems such as computer vision or character recognition. These third-party system(s) 220 may also include voice-to-text or text-to-voice systems and/or natural language processing systems which are able to receive, interpret, and convert voice commands to executable computing instructions.

The computing system 210 is configured to perform improved screen capturing that considers visually impaired users in accordance with the disclosed techniques. The computing system 210, for example, includes one or more processor(s) (such as one or more hardware processor(s) 212) and a storage (i.e., hardware storage device(s) 240) storing computer-executable instructions 218 wherein one or more of the hardware storage device(s) 240 is able to house any number of data types and any number of computer-executable instructions 218 by which the computing system 210 is configured to implement one or more aspects of the disclosed embodiments when the computer-executable instructions 218 are executed by the one or more processor(s) 212. The computing system 210 is also shown including user interface(s) 214 and input/output (I/O) device(s) 216. In particular, these I/O device(s) 216 are configured as accessible I/O device(s) which provide auditory information/feedback that considers visually impaired users as they use the screen capture tool within the user interface(s) 214.

As shown in FIG. 2, hardware storage device(s) 240 is shown as a single storage unit. However, it will be appreciated that, in some instances, the hardware storage device(s) 240 is a distributed storage that is distributed to several separate and sometimes remote systems and/or third-party system(s) 220. The computing system 210 may also comprise a distributed system with one or more of the components of computing system 210 being maintained and/or run by different discrete systems that are remote from each other and that perform different tasks. In some instances, a plurality of distributed systems performs similar and/or shared tasks for implementing the disclosed functionality, such as in a distributed cloud environment.

The hardware storage device(s) 240 are configured to store and/or cache in a memory store the different data types including screen capture types 241, application metadata 242, descriptions 243, post-capture metadata 244, and screen captures 245. Screen capture types 241 refer to different shapes and dimensions with which a user can adjust the screen capture tool. For example, some screen capture types include full-screen, window, adjustable shape, or free-form screen capture. Application metadata 242 refers to the metadata that can be accessed for different objects that correspond to one or more applications open and displayed within a user display. In some instances, application metadata is available for objects that are interactable and/or provide additional functionality when selected. Additionally, or alternatively, application metadata is provided for all objects displayed within the user interface. Additional metadata (e.g., post-capture metadata 244) can be obtained after a screen capture is generated by analyzing the screen capture using tools such as (OCR) or other applications of computer vision in which machine learning models extract data from an image and process that data to generate a corresponding numerical or semantic representation of the extracted data. These representations can include words and/or labels for objects identified in the image.

Descriptions 243 refer to the screen capture descriptions which are generated based on the application metadata 242 and/or post-capture metadata 244. In some instances, these descriptions 243 are stored as text which can be read by a third-party screen reader or other text-to-speech systems. In some instances, these descriptions 243 are stored as audio files comprising synthesized speech that describes the screen capture. Screen captures 245 include image-based file(s) of a screen or a portion of the screen captured using the accessible screen capture tool. Screen captures 245 also include, in some instances, the application metadata corresponding to objects included in the screen capture, post-application metadata, and/or screen capture descriptions based on the different metadata. Screen capture descriptions include conversational or prose-based descriptions based on information obtained from the metadata.

Hardware storage device(s) 240 also store machine learning models 247 which are configured to perform accessible screen capturing according to disclosed embodiments. For example, in some embodiments, a machine learning model is provided for converting application metadata and/or post-capture metadata into screen capture descriptions. Some machine learning models are provided for obtaining additional metadata for previously generated screen captures.

FIG. 1 will now be described in more detail. For example, FIG. 1 illustrates an example user interface for describing a user display. For example, FIG. 1 illustrates a computer monitor 102 with a user display 104. As illustrated in FIG. 1, the user display 104 is displaying an image of various objects, including mountains 106, a road 108, a sun 110, a person 112, and a bush 114. After entering the screen capture tool and prior to generating a screen capture, a screen reader is able to access metadata corresponding to each of these objects and narrate a description of each object to a user based on the metadata (e.g., "Road" 116, "Mountains" 118, "Sun" 120, "Person" 122, and "Bush" 124). In this manner, a user is able to know what is being displayed on the user display 104 (i.e., what objects are available to screen capture).

Figure 3:
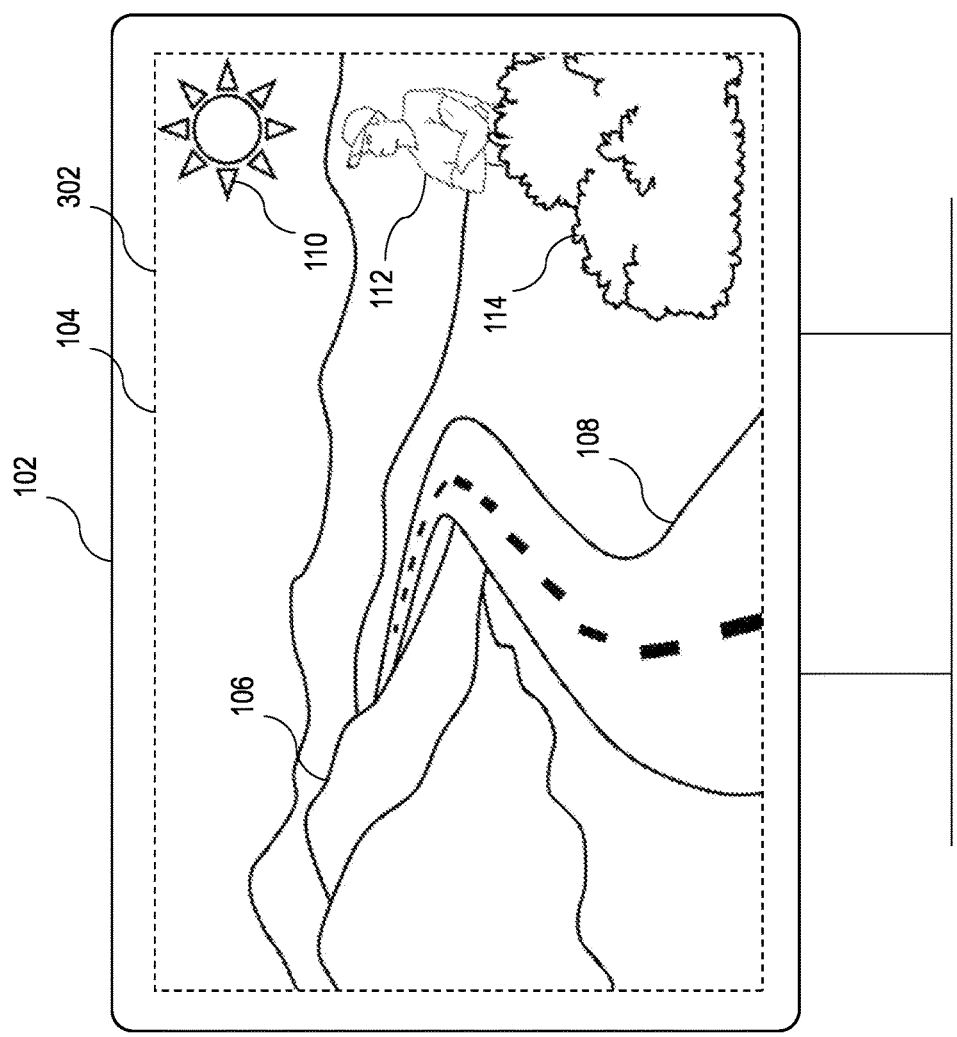
FIG. 3 illustrates an example of a full-screen capture.

As described above, there are many different types of screen captures which can be used to define the boundary of the screen capture. Attention will now be directed to FIG. 3, which illustrates an example of a full-screen capture. In a full-screen capture, a full-screen capture boundary 302 is defined along the same boundary as the outer edges of the user display. In this manner, everything displayed on the user display will be included in the screen capture. In such instances when full-screen mode is selected, either automatically or by the user, if descriptions of the objects have already been narrated to the user, the system automatically generates the full-screen capture without confirming, via additional narration, what is included in the full-screen capture boundary 302. In some instances, if the narration was provided previous to entering full-screen capture mode, the system can modify the granularity at which it will narrate descriptions of the various objects included in the full-screen capture boundary 302 (e.g., the system can describe fewer or greater number of objects, describe objects with more or less detail, or a combination thereof).

Figure 4:
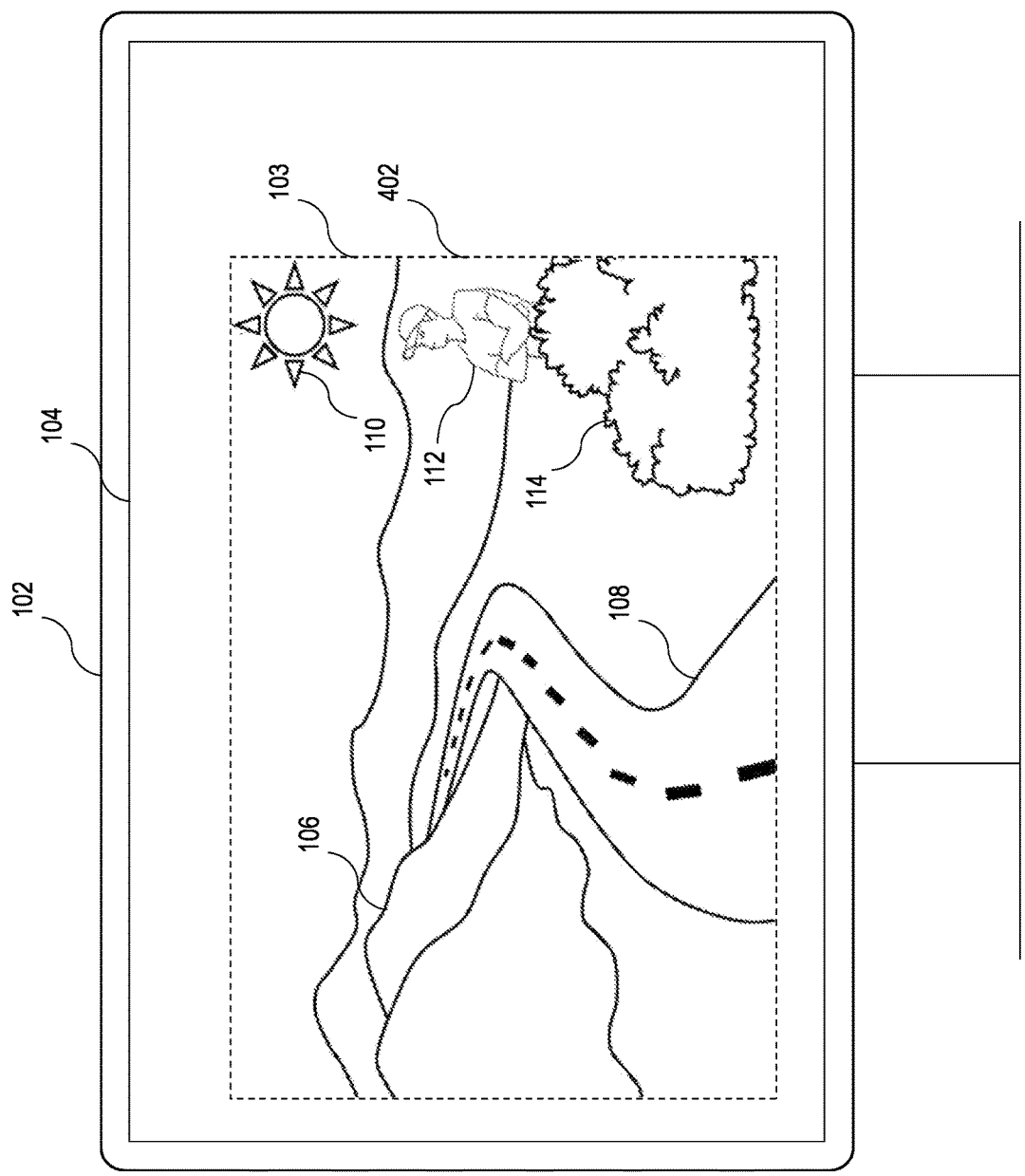
FIG. 4 illustrates an example of a window screen capture.

Attention will now be directed to FIG. 4, which illustrates an example of a window screen capture. In a window screen capture, a window screen capture boundary 402 is defined along the same boundary as the outer edges of a particular window (e.g., window 103) displayed within the user display. In this manner, everything displayed within the window will be included in the screen capture. In such instances when window screen mode is selected, either automatically or by the user, if descriptions of the objects have already been narrated to the user (e.g., if all the objects displayed in the user display are within the particular window), the system automatically generates the window screen capture without confirming, via additional narration, what is included in the window screen capture boundary 402.

In some instances, if the narration was provided previous to entering window screen capture mode, the system can modify the granularity at which it will narrate descriptions of the various objects included in the window screen capture boundary 402 (e.g., the system can describe fewer or greater number of objects, describe objects with more or less detail, or a combination thereof). In some instances, the user display 104 comprises a plurality of windows.

In this example, the system first narrates a summary description (e.g., a title associated with the window, such as an application and/or file name, or a limited number of objects from each window) of each window that is open, such that a user may select which window to screen capture in window screen capture mode. If the window that the user wishes to screen capture is open but minimized, the system will maximize the desired window.

In some instances, when the system provided a narration of possible windows to screen capture, after a user has selected a particular window (e.g., with an audible command), the system is able to temporally apply the window screen capture boundary 402 and narrate, at the same or different granularity, objects included within the window screen capture boundary 402. After the user is able to hear the description of the window screen capture boundary 402 that has been selected, the user confirms the window screen capture (e.g., with another audible command or verbal confirmation).

It will be appreciated that the foregoing embodiment, and the other embodiments described herein, can facilitate screen capture processes utilizing audible commands and audible descriptions of the content being captured for accommodating the needs and preferences of both visually impaired users, as well as non-visually impaired users. A non-visually impaired user may wish to utilize such functionality, for example, while being visually distracted or focused on other things than the computer screen where the image is being displayed. By way of further example, such functionality can be particularly useful for hands-free interfacing with a computing system while a user is driving or otherwise unable to view a screen where the image is being rendered.

Figure 5:
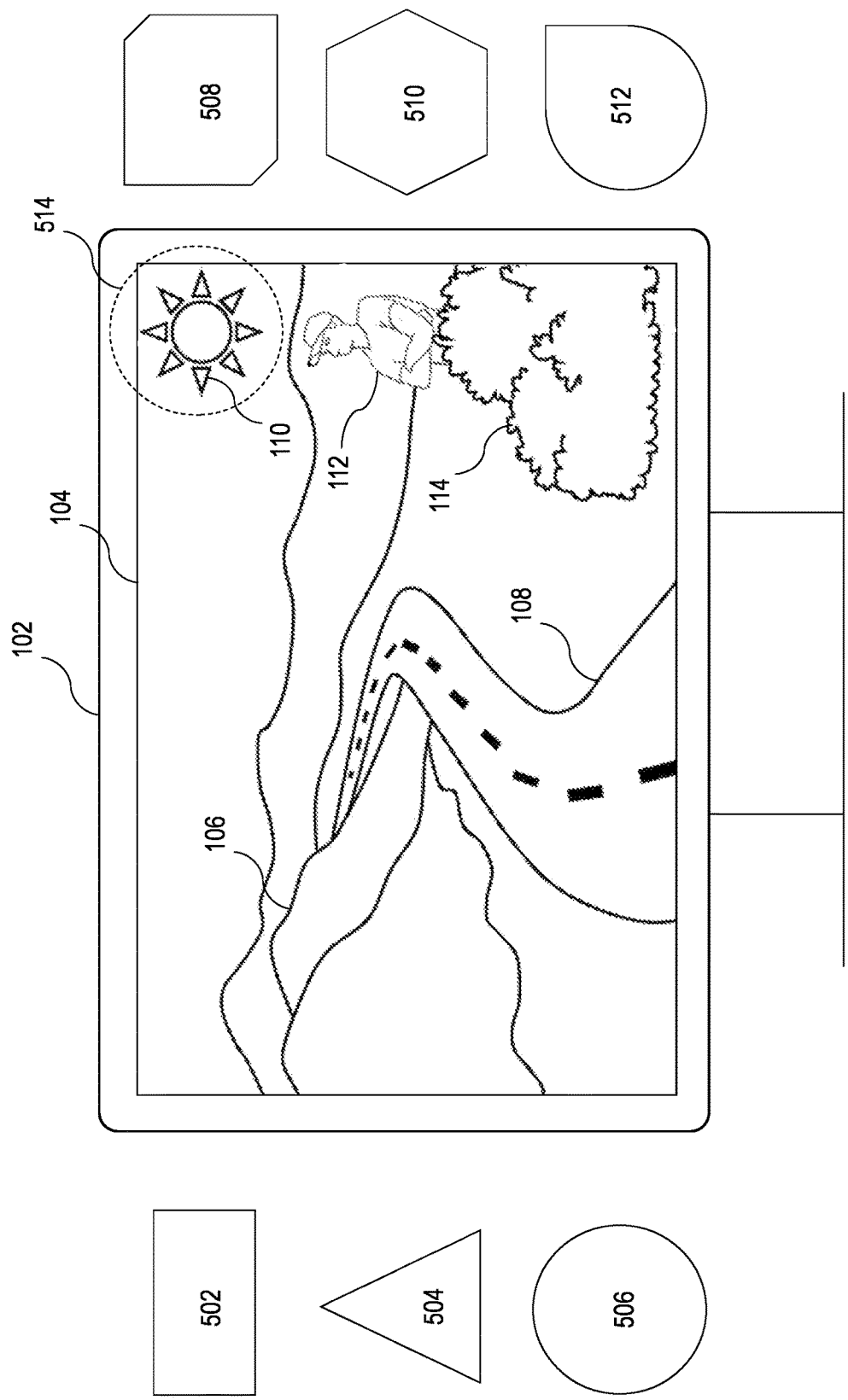
FIG. 5 illustrates an example of an adjustable shape screen capture.
Figure 6:
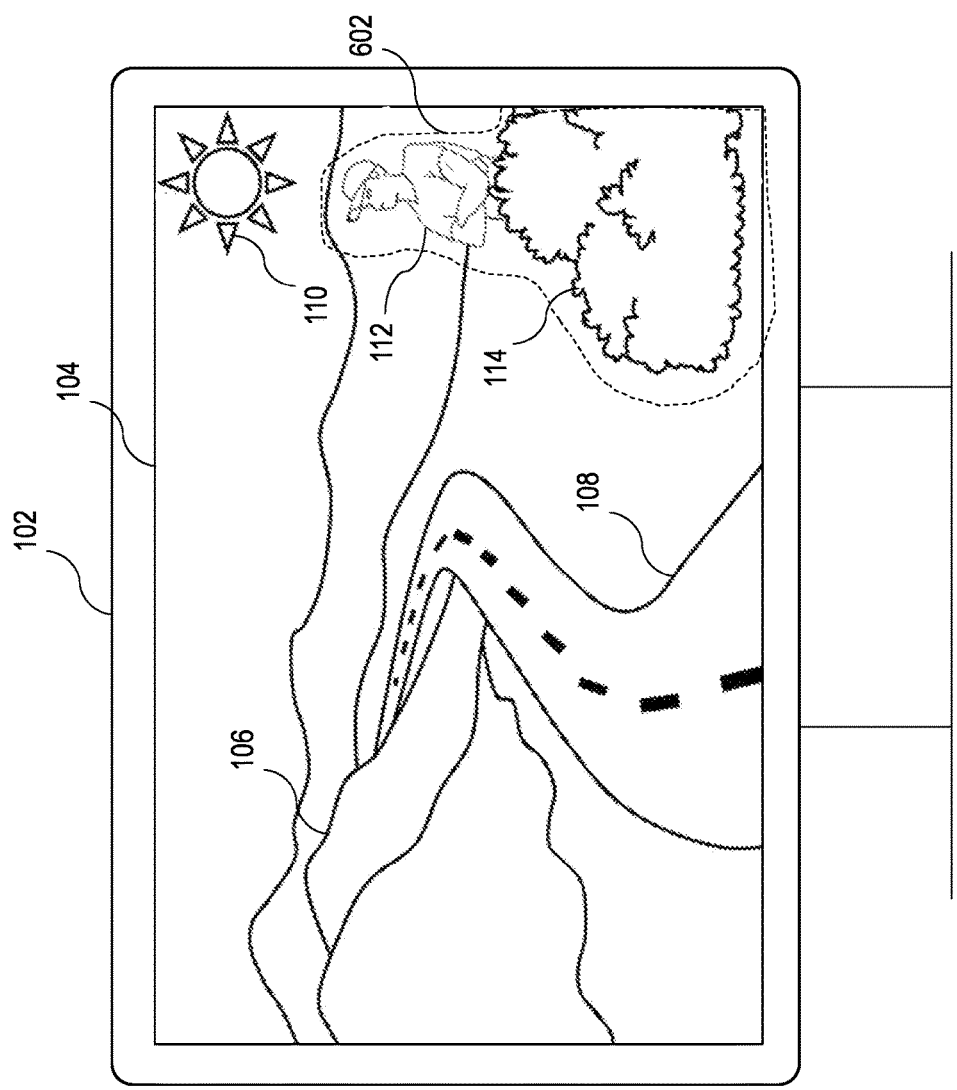
FIG. 6 illustrates an example of free-form screen capture.

Attention will now be directed to FIGS. 5-6, which illustrates an example of an adjustable shape screen capture. In the adjustable shape screen capture mode, a user selects from one or more different shapes (e.g., rectangle 502, triangle 504, circle 506, modified square 508, hexagon 510, raindrop 512, or other shape) to create a screen capture boundary. Once the system has received user input to select a particular shape, the system determines, either automatically, or by user input, the size and position of the particular shape superimposed onto the user display. In some instances, the system creates a screen capture boundary based on a user-defined shape. For example, as illustrated in FIG. 6, the system generated a screen capture boundary 602 based on user input which defined a free-form shape that includes objects such as the person and the bush. Once the free-form shape is created, the free-form shape can also be adjusted to be smaller or bigger, or moved to a different location on the user display.

The size and position of the shape define a screen capture area or screen capture boundary. For example, as illustrated in FIG. 5, circle 506 has been selected and positioned to capture the sun 110. Thus, circular screen capture boundary 514 is applied to the user display 104. In some instances, the circular screen capture boundary 514 is temporarily applied to the user display 104, wherein the system identifies one or more objects included in the potential screen capture boundary, accesses metadata corresponding to the one or more objects, generates a screen capture description based on the metadata, and narrates the screen capture description corresponding to the one or more objects. In this manner, a user is able to hear which objects will be included if the screen capture defined by the screen capture boundary is generated. The system can then receive user input confirming that the screen capture should be generated.

In some instances, after the system narrates the different objects displayed within the user display 104 (e.g., see FIG. 2), the system can receive user input which selects a type of screen capture (e.g., adjustable shape capture), a particular shape, and one or more objects displayed within the user display 104. For example, a user may select the adjustable shape screen capture mode, select the circle 506 as the shape of the screen capture, and identify the sun 110 as the object the user wants to include in the screen capture. The system is then able to automatically apply a circular screen capture boundary 514 which includes the sun 110. The system can adjust the screen capture boundary to include only the sun, or the sun along with other adjacent objects.

In other instances, a user is able to click a particular location of the user display and drag the mouse to define a particular size of the shape that was selected to be used as the screen capture shape. In some instances, the system receives user input describing a particular location and/or size of the shape. Thus, after the screen capture boundary is defined, either manually by the user or automatically using the information provided by the user, the system is able to narrate information about what is included in the screen capture boundary prior to generating the screen capture.

In some instances, the screen capture boundary is expanded or contracted, or moved to a different location. As the screen capture boundary changes, the system is configured to narrate, in real-time, which objects are included within the screen capture boundary. For example, initially, the screen capture area may comprise the sun. The system narrates the initial objects. Then, as the screen capture area increases, the system narrates additional objects, such as the person and the bush. If the screen capture area is moved to a new location, the system generates a new screen capture description. In either case of expansion/contraction or moved location, the system describes if the set of objects included in the new screen capture boundary is different from the old screen capture boundary. For example, the system describes which objects from the previous location have been left out and which objects have been added, if any.

Figure 13:
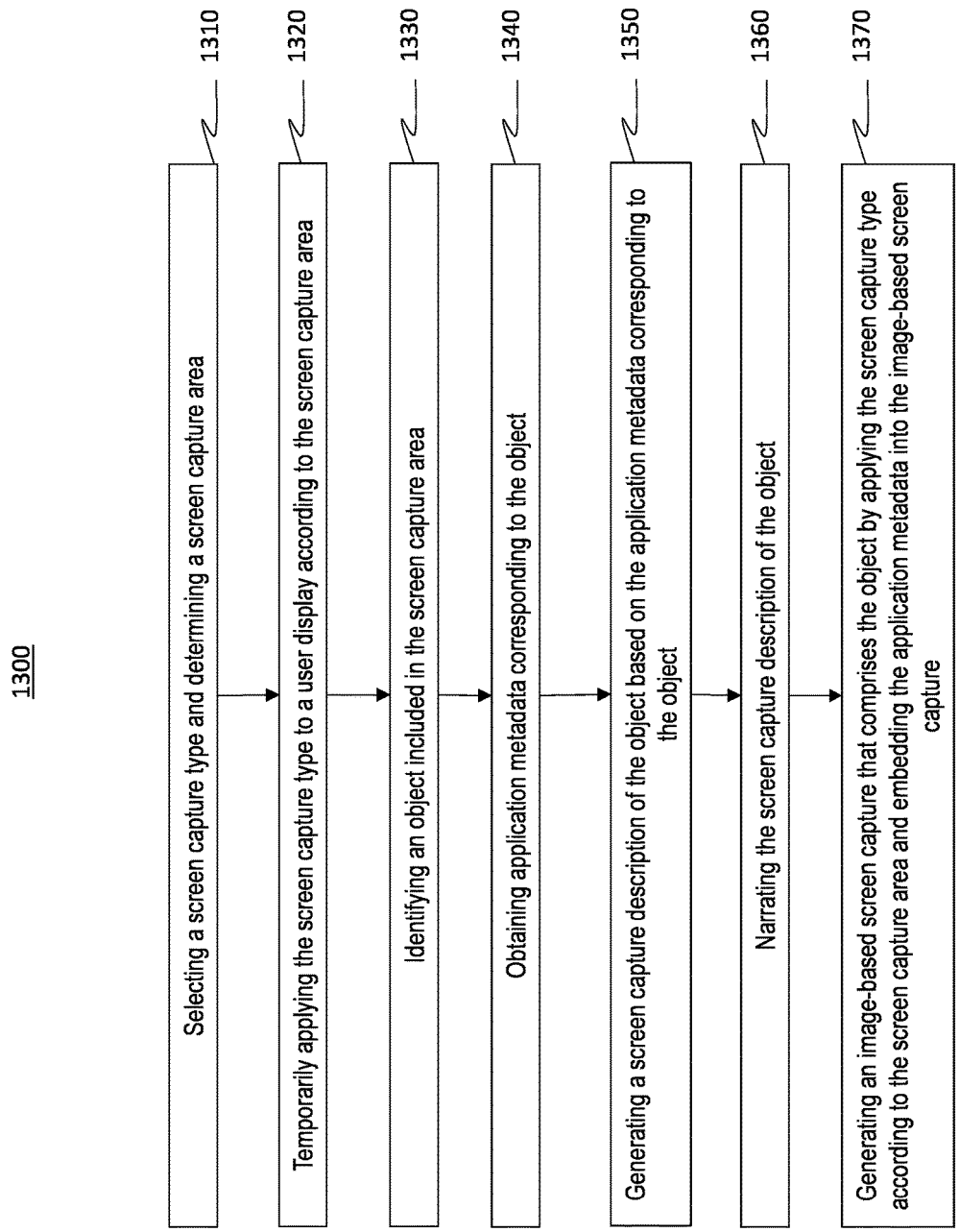
FIGS. 13-15 illustrate various embodiments of flow diagrams having a plurality of acts for describing methods associated with screen capture processes that consider visually impaired users.

Attention will now be directed to FIG. 13 which illustrates a flow diagram 1300 that includes various acts (act 1310, act 1320, act 1330, act 1340, act 1350, act 1360, and act 1370) associated with example methods that can be implemented by computing system 210 for utilizing an accessible screen capture tool. The description of FIG. 13 will include references to FIGS. 7-11 which illustrate an example method of describing a screen capture that considers visually impaired users.

Figure 7:
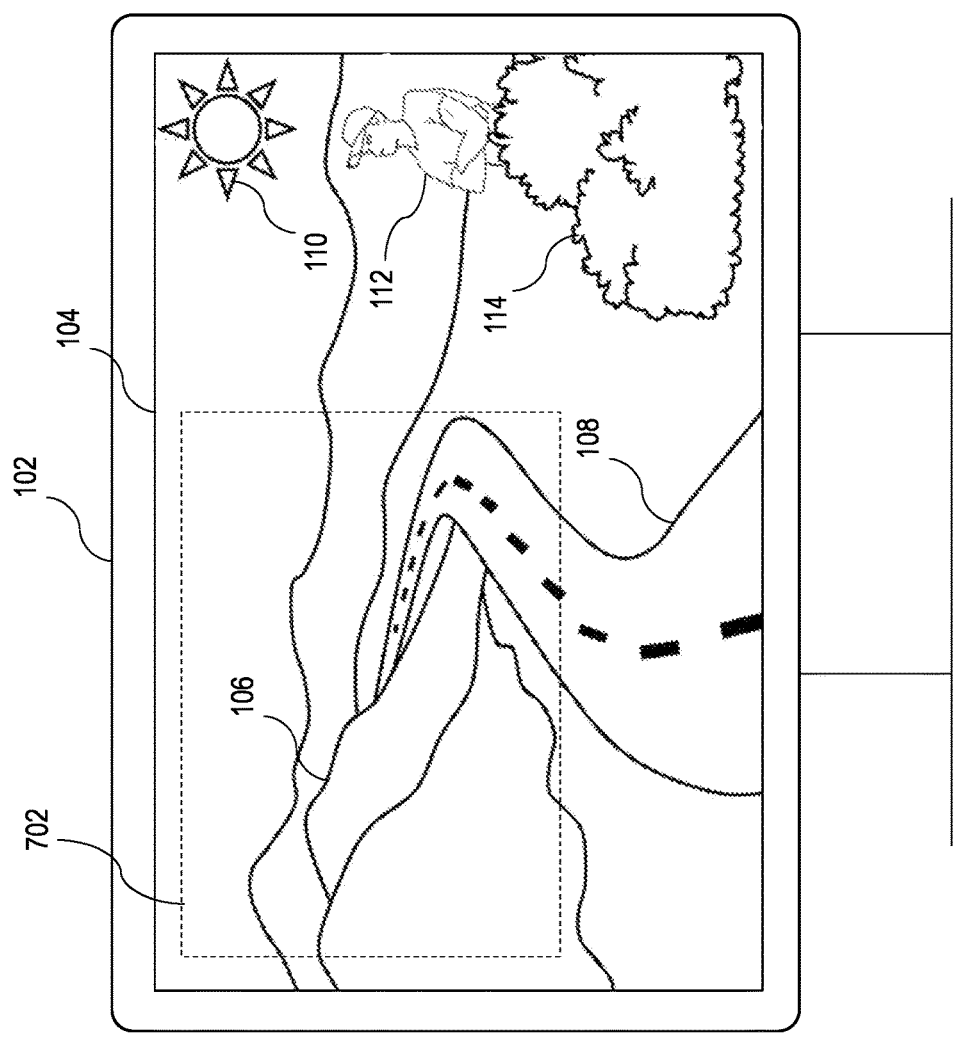
FIGS. 7-11 illustrate a series of example diagrams for describing a screen capture process.

For example, the first illustrated act includes a system selecting a screen capture type and determining a screen capture area (act 1310). This selection and determination are reflected in the user display illustrated in FIG. 7. The adjustable shape screen capture type is a rectangle and the screen capture area is the upper left-hand corner of the user display 104. The system then temporarily applies the screen capture type to the user display 104 according to the screen capture area (act 1320). This is shown in FIG. 7 as screen capture boundary 702 illustrated with dashed lines. After the screen capture boundary is temporarily applied to the user display 104, the system identifies one or more objects which are included in the screen capture area defined by the screen capture boundary 702 (act 1330).

Figure 8:
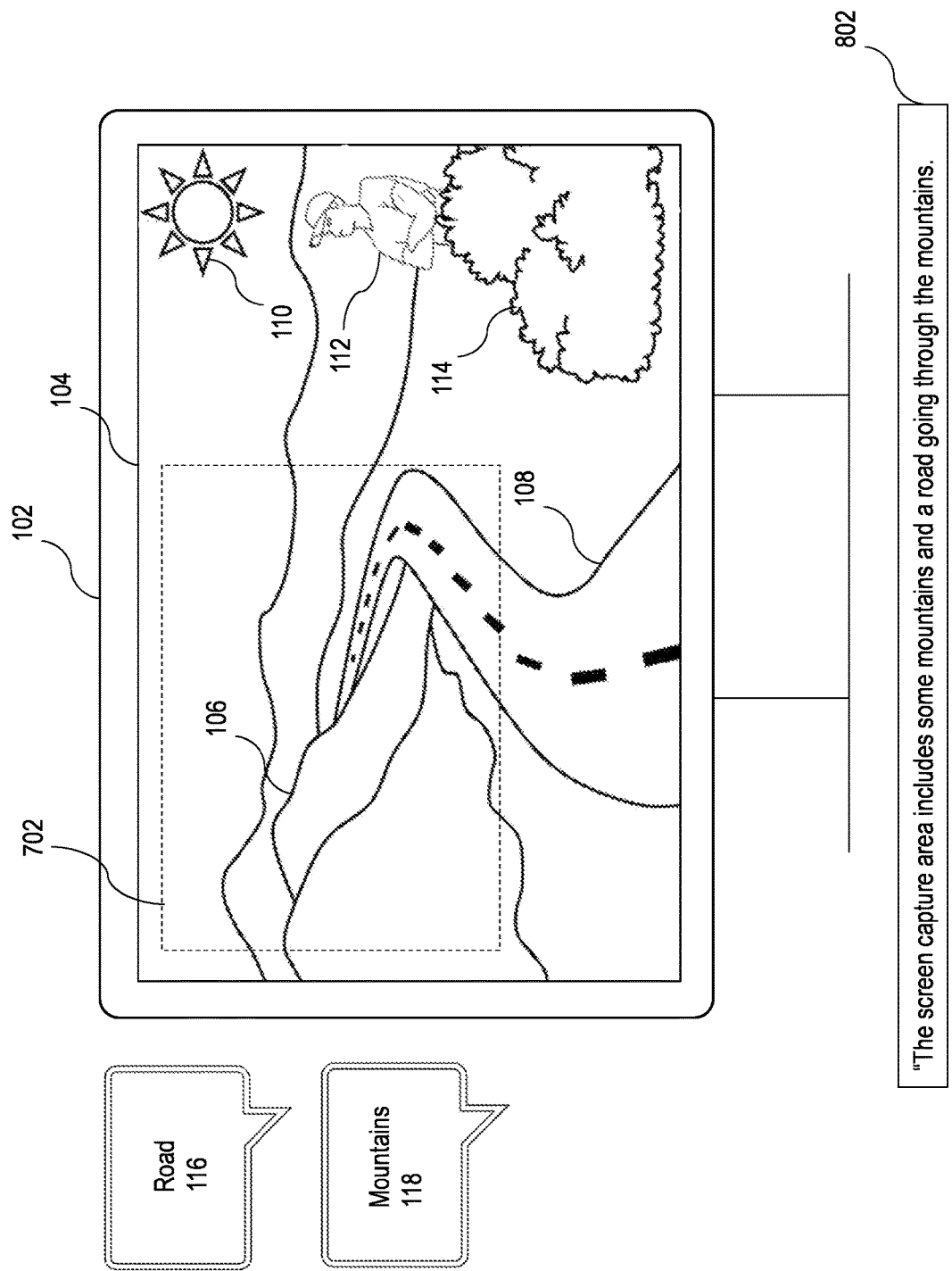

After identifying the different objects, the system obtains application metadata (e.g., road 116, mountains 118) corresponding to the different objects (act 1340). Based on the application metadata, the system generates a screen capture description (act 1350). In some instances, as shown in FIG. 8, the screen capture description includes a listing of the objects included in the screen capture (e.g., road, mountains). Additionally, or alternatively, the system generates screen capture description 802 which comprises a prose description of the screen capture area (e.g., "The screen capture area includes some mountains and a road going through the mountains."). In some instances, the system generates more detailed screen capture descriptions, such as: "The current screen capture area includes a rectangular shape located in the upper left-hand corner of the user display, covering approximately 60% of the user display. The screen capture area includes several green mountains, as well as a winding road that slowly disappears in between some of the mountains."

The system then narrates the screen capture description of the object(s) (act 1360). Subsequently, the system generates an image-based screen capture that comprises the object(s) by applying the screen capture type according to the screen capture area (e.g., the screen capture boundary 702) and embedding the application metadata into the image-based screen capture (act 1370). In some instances, the system also embeds the screen capture description into the image-based screen capture.

Figure 9:
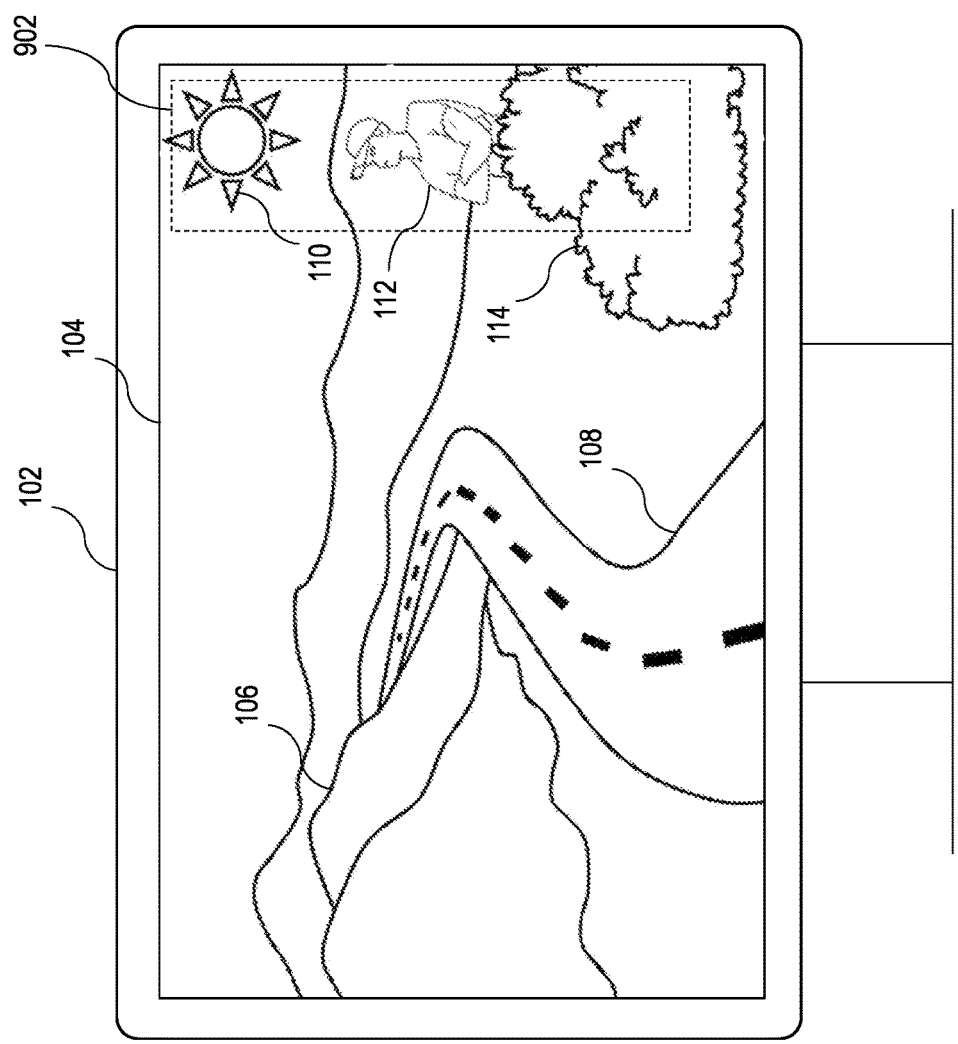
Figure 10:
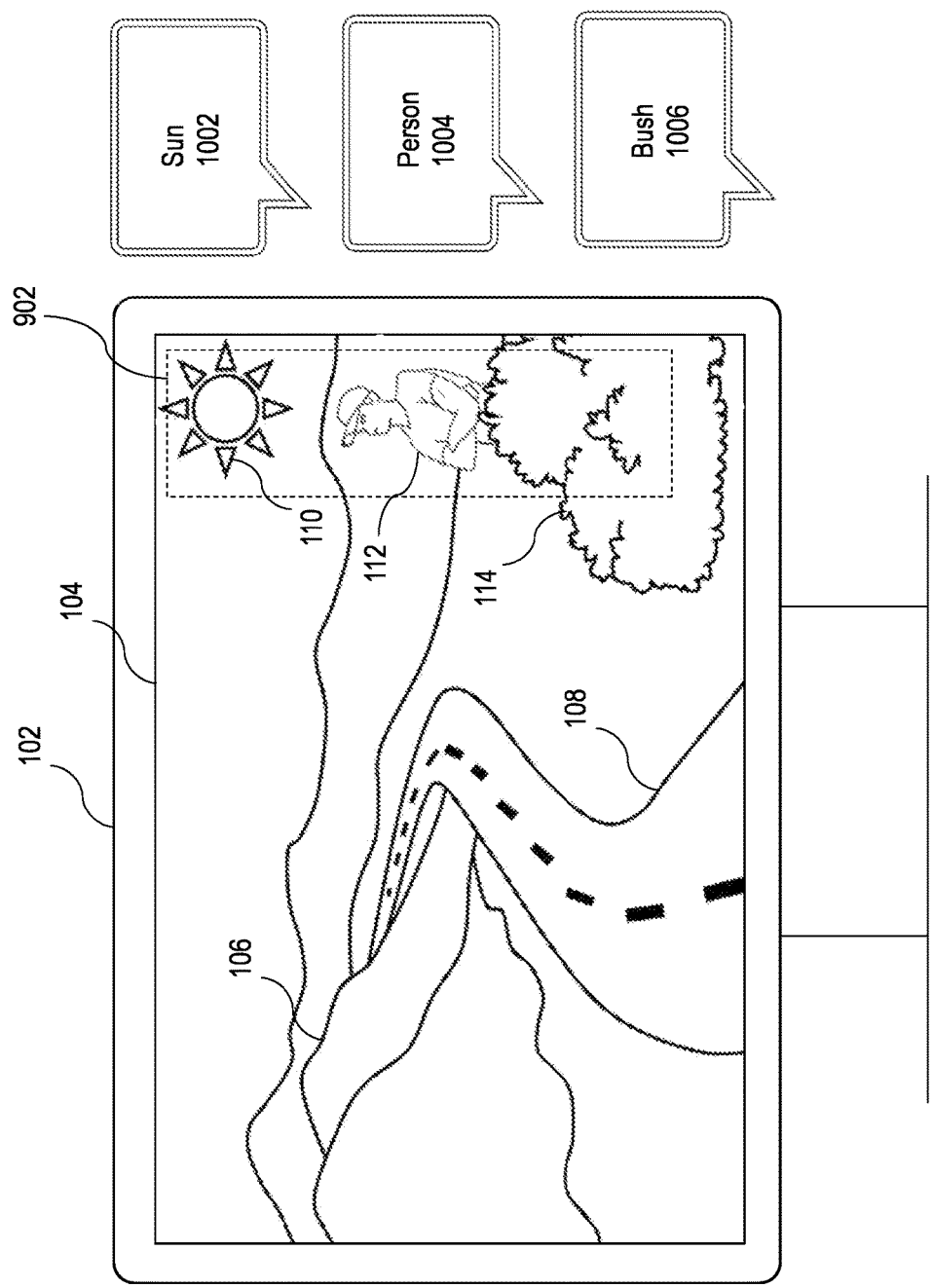
Figure 11:
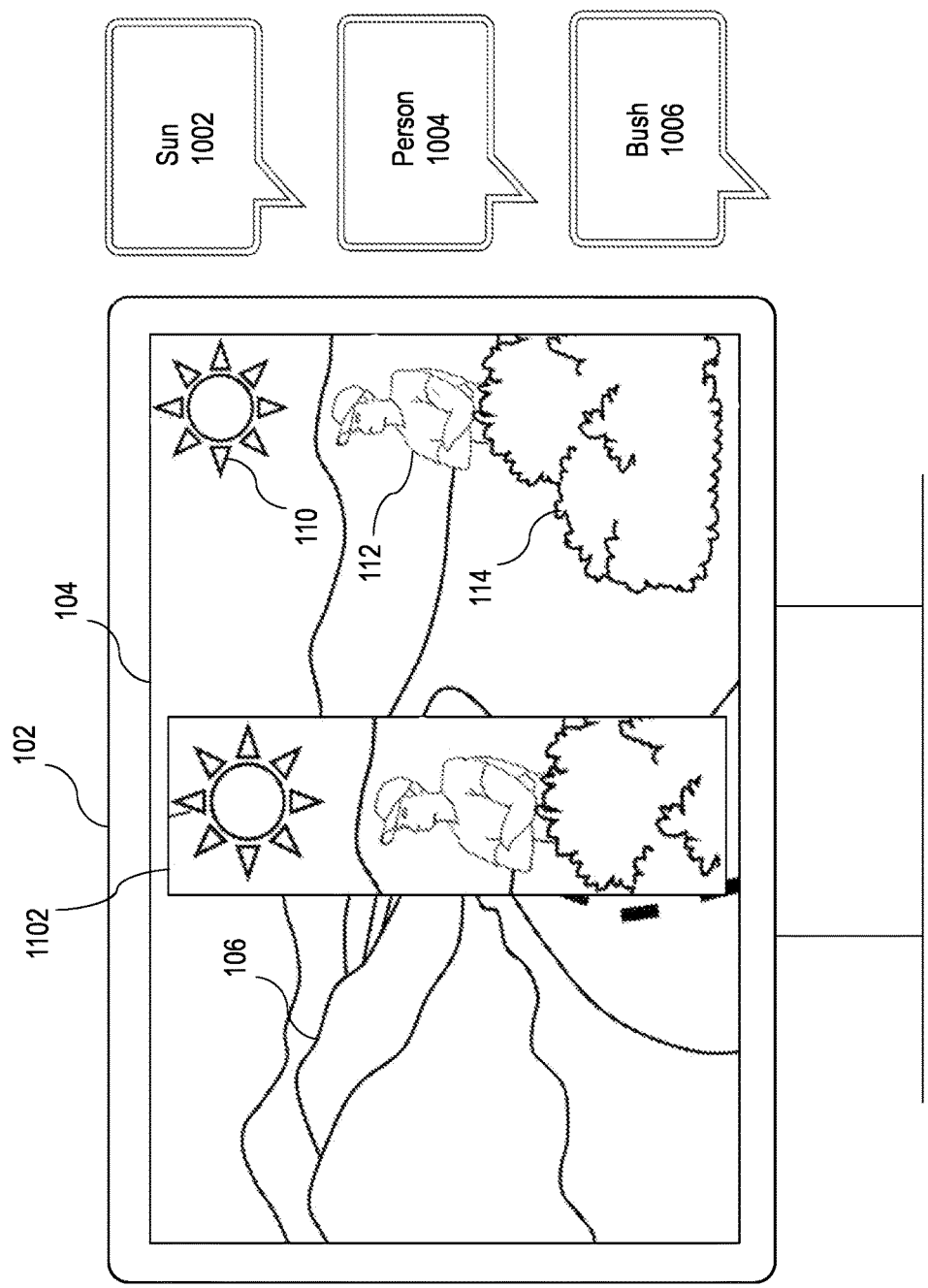

In some instances, as illustrated in FIG. 9, the screen capture boundary 702 is modified to create screen capture boundary 902, which includes a different set of objects within the new screen capture area. The system identifies the new objects (e.g., sun 110, person 112, and bush 114), obtains new metadata, and generates a new screen capture description (e.g., "Sun" 1002, "Person" 1004, and "Bush" 1006). The system narrates the new screen capture description. If the user confirms that this is the screen capture area desired, the system generates an image-based screen capture (e.g., image-based screen capture 1102 illustrated in FIG. 11) defined by the screen capture boundary 902.

Figure 12:
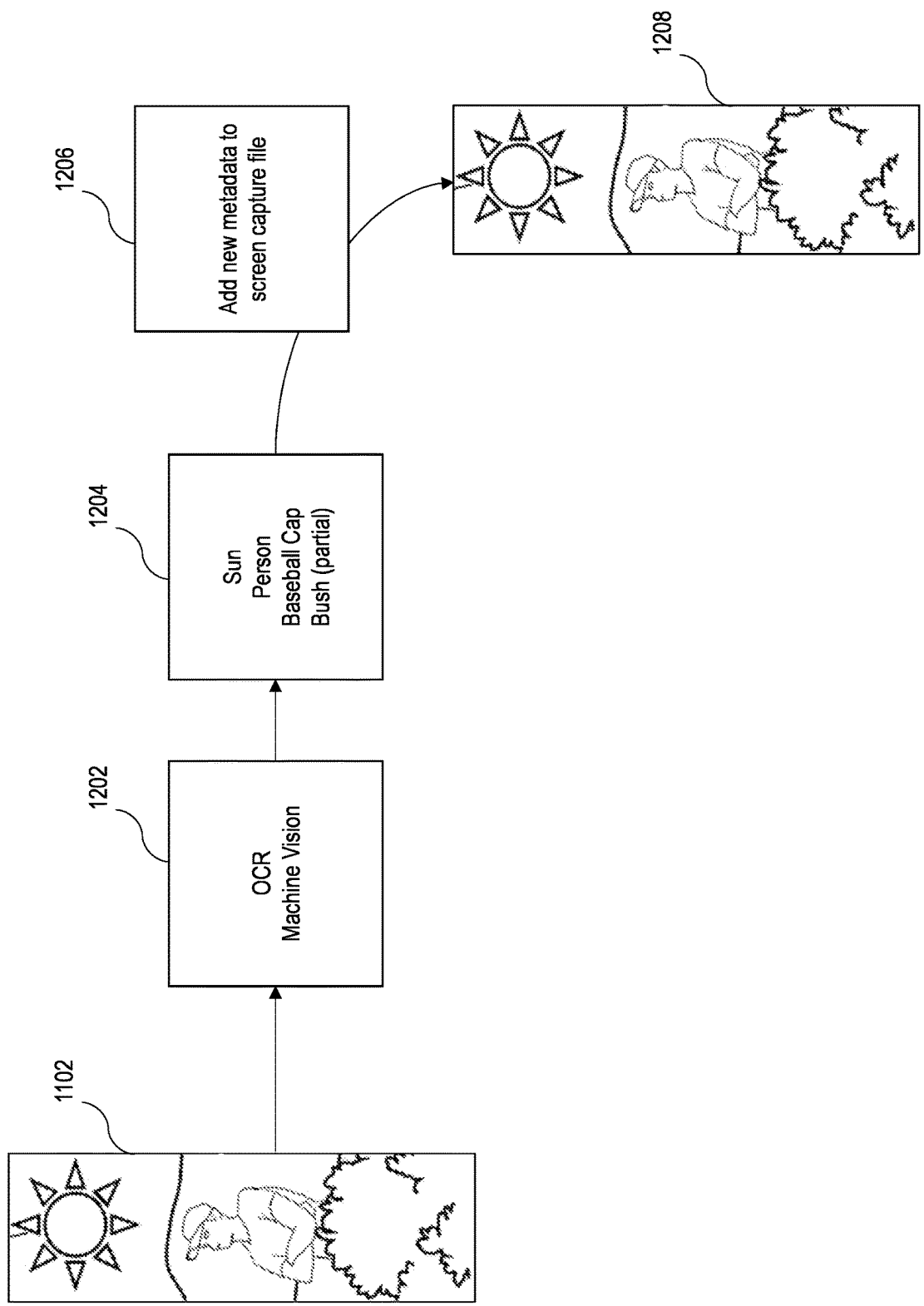
FIG. 12 illustrates an example diagram for obtaining new metadata for a previously generated screen capture.

In some instances, as shown in FIG. 12 the system further analyzes the image-based screen capture 1102 using computer vision, or an OCR system (e.g., models 1202). Using computer vision, the system identifies one or more objects in the image-based screen capture 1102 and generates new metadata 1204 (e.g., sun, person, baseball cap, bush (partial)) corresponding to a new object(s) identified by the computer vision. The system then embeds (see item 1206) the new metadata into the image-based screen capture and generates a new screen capture file 1208. In some instances, the system compares the new metadata against metadata previously embedded in the screen capture. In such instances, the system only embeds the portions of the new metadata that is different from the previous metadata. The system is also able to generate a new screen capture description of the new object based on the new metadata and narrate the new screen capture description.

As described above, there are many different types of screen capture modes that can be selected, such as full-screen capture, window screen capture, adjustable shape screen capture, and free-form capture. In window screen capture mode, the system identifies a window displayed on the user display, obtains window metadata corresponding to the window, and generates a screen capture description of the window based on the window metadata. The image-based screen capture further comprises generating the image-based screen capture of the window by applying a window screen capture to the window displayed on the user display.

In some instances, the system is configured to generate multiple screen capture descriptions at different granularities of detail. For example, in some instances, an initial screen capture description at a coarse granularity (e.g., a listing of some objects included in the screen capture area) is narrated. Users can then indicate to a system if the system should subsequently narrate a more detailed version of the screen capture description. For example, a user may provide user input to describe additional objects within the screen capture area, or a more detailed description of a particular object.

Using one or more different methods, the system determines a granularity at which to generate a screen capture description for a plurality of objects displayed within the screen capture area. In some instances, the granularity is automatically determined based on a number of objects included within the screen capture area. In some instances, the granularity is automatically determined based on a context of objects displayed within the screen capture area. Additionally, or alternatively, the granularity is determined based on user input.

When the system determines to change the screen capture area to a new screen capture area, the system is able to modify the granularity based on the new screen capture area. The system changes the screen capture area based on different criteria. In some examples, the system determines a percentage of the object that is included in the screen capture area and determines that the percentage of the object does not meet or exceed a predetermined threshold. Upon determining that the percentage of the object does not meet or exceed the predetermined threshold, the system adjusts the screen capture area to include a larger portion of the object.

It should be appreciated that the screen capture boundary can be created using varying degrees of user input. For example, in some instances, the user input defines the screen capture type and screen capture area. Additionally, or alternatively, the user input defines the objects that the user wishes to include in the screen capture area and the system automatically selects the screen capture type and screen capture area which will include the desired objects. For example, the system identifies a plurality of objects in the screen capture area, obtains application metadata corresponding to the plurality of objects, and generates/narrates a screen capture description of the plurality of objects.

The system then receives user input that identifies a subset of the plurality of objects to screen capture. Based on the user input, the system automatically selects the screen capture type and the screen capture area that will capture the subset of the plurality of objects while excluding objects not identified by the user input. The system is then able to generate an image-based screen capture that comprises the subset of the plurality of objects by applying the screen capture type according to the screen capture area.

Figure 14:
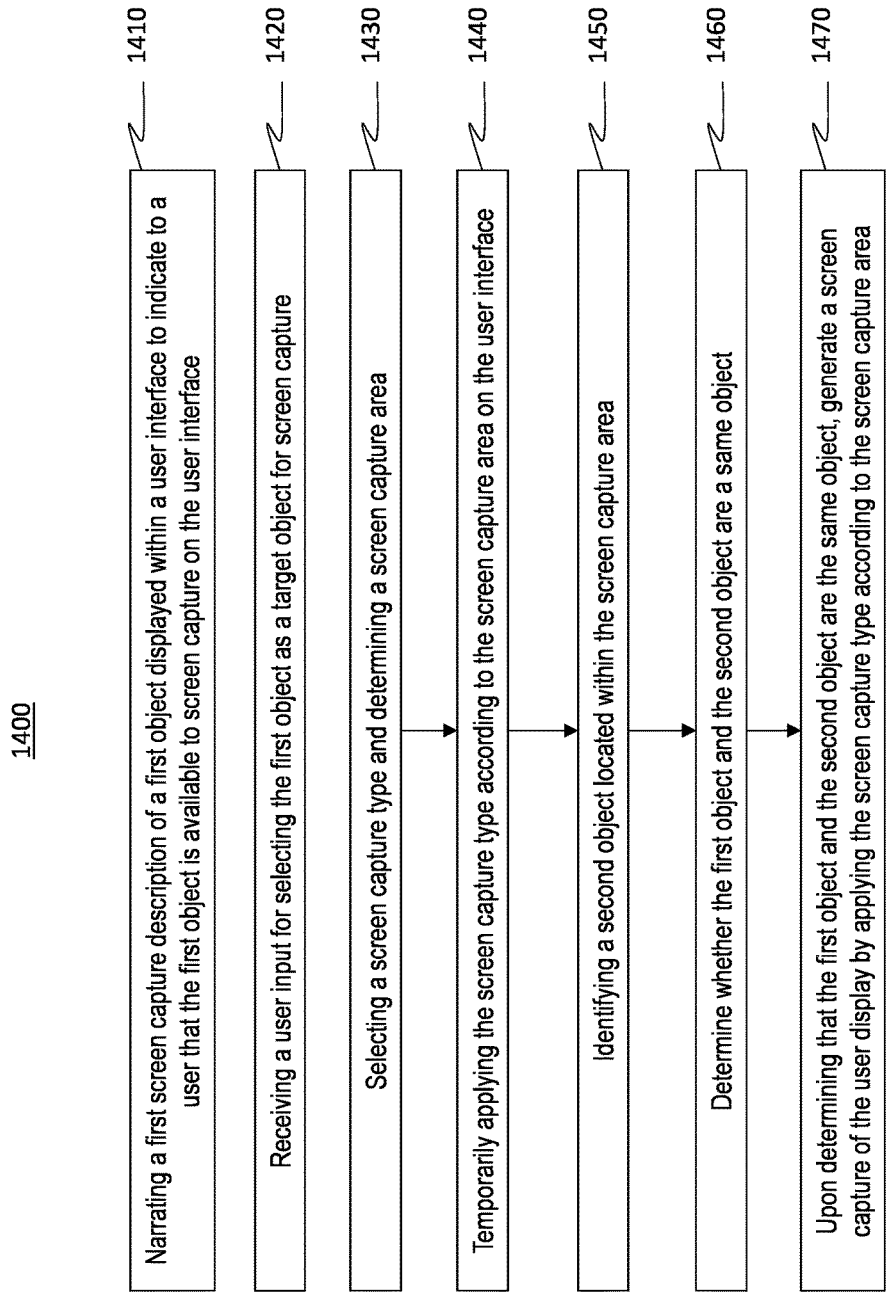

Attention will now be directed to FIG. 14 which illustrates a flow diagram 1400 that includes various acts (act 1410, act 1420, act 1430, act 1440, act 1450, act 1460, and act 1470) associated with example methods that can be implemented by computing system 210 for utilizing an accessible screen capture tool.

For example, a first illustrated act is provided for narrating a first screen capture description (e.g., "Road" 116, FIG. 1) of a first object (e.g., road 108, FIG. 1) to indicate to a user that the first object is available to screen capture (act 1410) on a user interface (e.g., user display 104, FIG. 1). In some instances, the screen capture description is generated by identifying an application that is displayed on a user display. The system then obtains application metadata corresponding to the first object displayed within the user interface of the application and generates the first screen capture description of the first object based on the first application metadata.

The system then receives a user input for selecting the first object as a target object for screen capture prior to generating a screen capture (act 1420). For example, after a user accesses a user interface, the system is able to narrate different objects that are being displayed in the user interface (see FIG. 1). Users can then verbally select (e.g., using a voice command) which object(s) they would like to include in a screen capture of the user interface. In some instances, the user input is received after the screen capture tool is selected. Alternatively, the user input is received as a voice command which selects the target object(s) and opens the screen capture tool.

The system selects a screen capture type (e.g., from screen capture types 214, FIG. 2) and determines a screen capture area (act 1430) and temporarily applies the screen capture type according to the screen capture area (e.g., screen capture boundary 702, FIG. 7) (act 1440).

The selection of the screen capture type and the initial screen capture area can be selectively and automatically based on a context that is determined for the initial preselected object(s). In particular, using identification of a boundary of the preselected object(s), the system can determine a type and boundary of a screen capture area that will include the entirety of the edges of the preselected object(s). Based on heuristics and profile preferences, the system can also determine a type of the screen capture to use (e.g., if the user has historically used free form boundaries for the screen capture area or, alternatively, rectangular boundaries, the system can make similar selections that will still capture the intended bounds of the preselected object(s). The system can consider these heuristics and profile preferences by analyzing user profile settings in stored profile records associated with the user and/or current application historical records.

Once the initial screen capture type and screen capture area are determined, the systems identify a second object (e.g., road 108) located within the screen capture area (act 1450) and further determine whether the first (preselected) object and the second object contained in the screen capture area are actually the same object (act 1460).

For example, if the user selected the road as the target object, the system is able to determine that the road is included within the temporary screen capture boundary. Upon determining that the first object and the second object are the same object, the system automatically generates a final screen capture of the user display by applying the screen capture type according to the screen capture area (act 1470). In this manner, the system is able to generate a screen capture without having to receive subsequent user input to reselect the first object as the target object for screen capture. Additionally, it ensures that the desired objects are included within the screen capture boundary before generating the final screen capture.

In some instances, the system also obtains application metadata for the second object and generates a second screen capture description (e.g., "Road" 116, screen capture description 802, FIG. 8) of the second object based on the application metadata. Prior to generating a screen capture, the system narrates the second screen capture description of the second object. By implementing methods in this manner, the user is able to hear auditory confirmation of the objects that are included in the screen capture area prior to generating the screen capture file.

If the object(s) is/are not the desired object(s), the user has the ability to adjust the screen capture area. For example, upon determining that the first object and the second object are not the same, the system automatically adjusts the screen capture area to include the first object that was preselected. For example, if the user had selected the sun 110 as the target object, but the temporary screen capture area (e.g., screen capture boundary 702) did not include the sun 110, the system can adjust the screen capture boundary to include the sun (e.g., screen capture boundary 902, FIG. 9). In some instances, the system adjusts the screen capture boundary to at least include the target object (i.e., the sun 110), wherein other objects may be included as in FIG. 9. Alternatively, the system adjusts the screen capture boundary to include only the target object and exclude others (e.g., circular screen capture boundary 514, FIG. 5).

Figure 15:
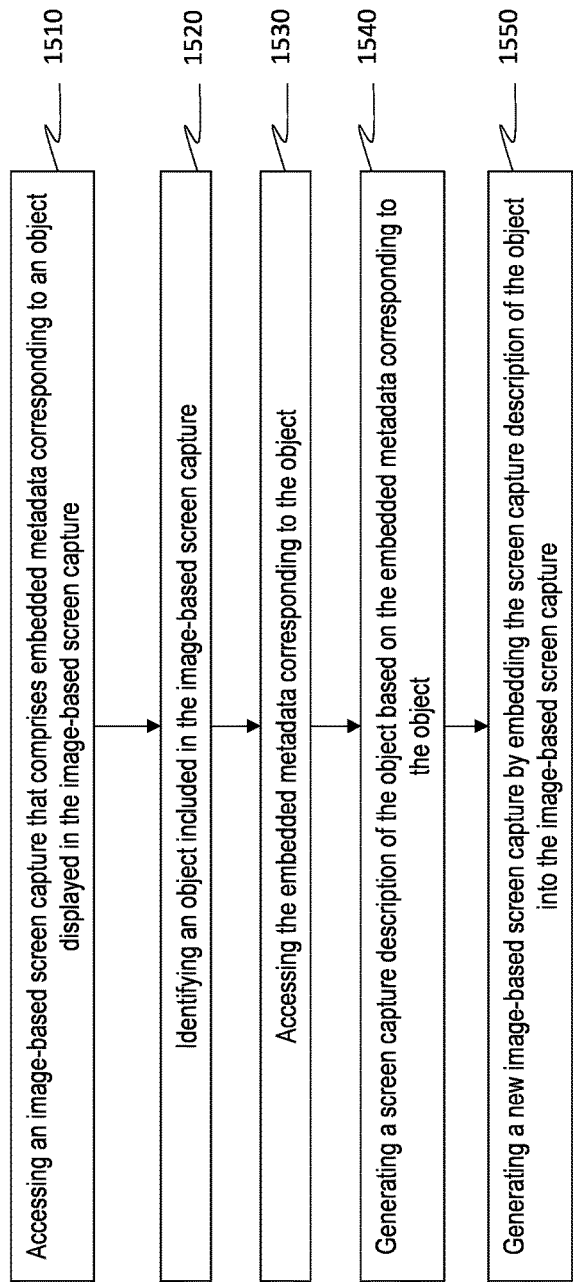

Attention will now be directed to FIG. 15 which illustrates a flow diagram 1500 that includes various acts (act 1510, act 1520, act 1530, act 1540, and act 1550) associated with example methods that can be implemented by computing system 210 for utilizing an accessible screen capture tool. The description of FIG. 15 will include references to FIGS. 11, which illustrates an example method of describing a previously generated screen capture that considers visually impaired users.

For example, the first illustrated act includes accessing an image-based screen capture 1102 that comprises embedded metadata corresponding to one or more object(s) (e.g., sun 110, person 112, bush 114) displayed in the image-based screen capture 1102 (act 1510). The system then identifies an object included in the image-based screen capture 1102 (act 1520) and accesses the embedded metadata corresponding to the object (act 1530). The system generates a screen capture description of the object (e.g., "Sun" 1002) based on the embedded metadata (act 1540). By generating (and/or narrating) the screen capture description, the user is able to know which objects were included in the screen capture that was generated. The system then generates a new image-based screen capture by embedding the screen capture description of the object into the image-based screen capture (act 1550).

In some instances, the system further analyzes the image-based screen capture using computer vision and is able to generate new metadata corresponding to a new object (e.g., baseball cap) identified by the computer vision. This new metadata is embedded into the new image-based screen capture so that a new screen capture description of the new object based on the new metadata can be generated.

Prior to embedding the new metadata corresponding to the new object, the system narrates the new screen capture description of the new object. The system can prompt the user for confirmation such that upon receiving user input confirming that the computing system should embed the new metadata into the new image-based screen capture, the system embeds the new metadata.

In view of the foregoing, it should be appreciated that the disclosed embodiments are directed to improved systems and methods which provide technical advantages over conventional methods for performing accessible screen capturing. Thus, disclosed embodiments are directed to systems and methods for a screen capture tool that is accessible to visually impaired users. The systems and methods provided are configured to generate screen capture descriptions at various stages of the screen capture process. By implementing systems and methods in this manner, visually impaired users are able to confirm and know what objects are available to capture, which objects will be captured within a potential screen capture boundary, and which objects have been captured in a generated screen capture. Additionally, systems and methods are provided for obtaining additional metadata about the screen capture using post-capture analysis such as computer vision and/or OCR technology.

In this manner, the screen capture descriptions are further improved by including information not initially available through the application data. Additionally, previously generated screen captures can be adapted to an accessible screen capture using disclosed embodiments. The screen capture descriptions are further improved in that machine learning models, such as natural language processing models, are able to convert metadata into easily consumable synthesized speech descriptions, which describe the screen capture (or potential screen capture) in conversational or prose language. Overall, disclosed embodiments provide an accessible screen capture tool that allows visually impaired users to utilize the screen capture functionality on their computing devices.

Example Computing Systems

Embodiments of the present disclosure may comprise or utilize a special-purpose or general-purpose computer (e.g., computing system 210) including computer hardware, as discussed in greater detail below. Embodiments within the scope of the present disclosure also include physical and other computer-readable media for carrying or storing computer-executable instructions and/or data structures. Such computer-readable media can be any available media that can be accessed by a general-purpose or special-purpose computer system.

Computer-readable media (e.g., hardware storage device(s) 240 of FIG. 1) that store computer-executable instructions (e.g., computer-executable instructions 218 of FIG. 2) are physical hardware storage media/devices that exclude transmission media. Computer-readable media that carry computer-executable instructions or computer-readable instructions (e.g., computer-executable instructions 218) in one or more carrier waves or signals are transmission media. Thus, by way of example, and not limitation, disclosed embodiments can comprise at least two distinctly different kinds of computer-readable media: physical computer-readable storage media/devices and transmission computer-readable media.

Physical computer-readable storage media/devices are hardware and include RAM, ROM, EEPROM, CD-ROM or other optical disk storage (such as CDs, DVDs, etc.), magnetic disk storage or other magnetic storage devices, or any other hardware which can be used to store desired program code means in the form of computer-executable instructions or data structures and which can be accessed by a general purpose or special purpose computer.

A "network" (e.g., network 230 of FIG. 1) is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links that can be used to carry, or desired program code means in the form of computer-executable instructions or data structures, and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosed embodiments may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The disclosed embodiments may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present disclosure may be embodied in other specific forms without departing from its essential characteristics. The described embodiments are to be considered in all respects only as illustrative and not restrictive. The scope of the disclosed embodiments is, therefore, indicated by the appended claims rather than by the foregoing description. All changes which come within the meaning and range of equivalency of the claims are to be embraced within their scope.

What is claimed is:

1. A method implemented by a computing system for generating an accessible image-based screen capture, the method comprising:
    selecting a screen capture type and determining a screen capture area;
    temporarily applying the screen capture type to a user display according to the screen capture area;
    identifying an object included in the screen capture area;
    obtaining application metadata corresponding to the object;
    generating a screen capture description of the object based on the application metadata corresponding to the object;
    narrating the screen capture description of the object; and
    generating an image-based screen capture that comprises the object by applying the screen capture type according to the screen capture area and embedding the application metadata into the image-based screen capture.

2. The method of claim 1, further comprising:
    analyzing the image-based screen capture using computer vision;
    generating new metadata corresponding to a new object identified by the computer vision;
    embedding the new metadata into the image-based screen capture;
    generating a new screen capture description of the new object based on the new metadata; and
    narrating the new screen capture description.

3. The method of claim 1, wherein the screen capture type is a full-screen capture.

4. The method of claim 1, further comprising:
    identifying a window displayed on the user display;
    obtaining window metadata corresponding to the window; and
    generating a screen capture description of the window based on the window metadata;
    wherein generating the image-based screen capture further comprises generating the image-based screen capture of the window by applying a window screen capture to the window displayed on the user display.

5. The method of claim 1, wherein the screen capture type is an adjustable shape.

6. The method of claim 1, wherein the screen capture type is a free-form screen capture.

7. The method of claim 1, further comprising:
determining a granularity at which to generate a screen capture description for a plurality of objects displayed within the screen capture area.

8. The method of claim 7, wherein the granularity is automatically determined based on a number of objects included within the screen capture area.

9. The method of claim 7, wherein the granularity is automatically determined based on a context of objects displayed within the screen capture area.

10. The method of claim 7, wherein the granularity is determined based on a user input.

11. The method of claim 7, further comprising:
determining to change the screen capture area to a new screen capture area; and
upon determining to change the screen capture area, modifying a granularity based on the new screen capture area.

12. The method of claim 1, further comprising:
determining a percentage of the object that is included in the screen capture area;
determining that the percentage of the object does not meet or exceed a predetermined threshold; and
upon determining that the percentage of the object does not meet or exceed the predetermined threshold, adjusting the screen capture area to include a larger portion of the object.

13. The method of claim 1, further comprising:
identifying a plurality of objects in the screen capture area;
obtaining application metadata corresponding to the plurality of objects;
generating a screen capture description of the plurality of objects;
receiving user input that identifies a subset of the plurality of objects to screen capture;
based on the user input, automatically selecting the screen capture type and the screen capture area that will capture the subset of the plurality of objects while excluding objects not identified by the user input; and
generating an image-based screen capture that comprises the subset of the plurality of objects by applying the screen capture type according to the screen capture area.

* * * * *